(12) United States Patent
Lim et al.

(10) Patent No.: US 9,161,284 B2
(45) Date of Patent: Oct. 13, 2015

(54) METHOD AND APPARATUS FOR PERFORMING HANDOVER USING PATH INFORMATION IN WIRELESS COMMUNICATION SYSTEM

(71) Applicant: LG Electronics Inc., Seoul (KR)

(72) Inventors: Dongguk Lim, Gyeonggi-do (KR); Dongcheol Kim, Gyeonggi-do (KR); Kyujin Park, Gyeonggi-do (KR); Jiwoong Jang, Gyeonggi-do (KR); Hangyu Cho, Gyeonggi-do (KR); Jiwon Kang, Gyeonggi-do (KR); Sungho Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 207 days.

(21) Appl. No.: 13/780,473

(22) Filed: Feb. 28, 2013

(65) Prior Publication Data

US 2013/0225180 A1 Aug. 29, 2013

Related U.S. Application Data

(60) Provisional application No. 61/604,531, filed on Feb. 29, 2012, provisional application No. 61/611,533, filed on Mar. 15, 2012.

(51) Int. Cl.
*H04W 36/32* (2009.01)
*H04W 36/16* (2009.01)

(52) U.S. Cl.
CPC ............ *H04W 36/32* (2013.01); *H04W 36/165* (2013.01)

(58) Field of Classification Search
CPC ....................................................... H04W 36/32
USPC ........... 370/331, 332; 455/436, 437, 440, 430
See application file for complete search history.

(56) References Cited

U.S. PATENT DOCUMENTS

| | | | |
|---|---|---|---|
| 6,266,529 B1 * | 7/2001 | Chheda | 455/436 |
| 2004/0203792 A1 * | 10/2004 | Shaheen et al. | 455/444 |
| 2005/0221828 A1 * | 10/2005 | Wakuta et al. | 455/437 |
| 2009/0213812 A1 * | 8/2009 | Park et al. | 370/331 |
| 2010/0254346 A1 * | 10/2010 | Jain et al. | 370/331 |
| 2011/0013596 A1 * | 1/2011 | Jung et al. | 370/331 |

* cited by examiner

*Primary Examiner* — Vladimir Magloire
*Assistant Examiner* — Ernest Tacsik
(74) *Attorney, Agent, or Firm* — Morgan, Lewis & Bockius LLP

(57) ABSTRACT

A method for performing handover at a mobile terminal which moves along an established path in a wireless communication system includes transmitting an indicator indicating a handover type to a serving base station without performing measurement with respect to neighboring base stations and movement path information and transmitting current position information of the mobile terminal to the serving base station.

8 Claims, 13 Drawing Sheets

FIG. 2
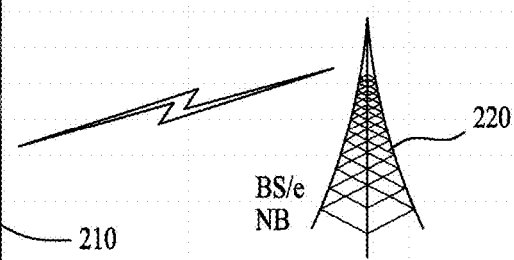
FIG. 3
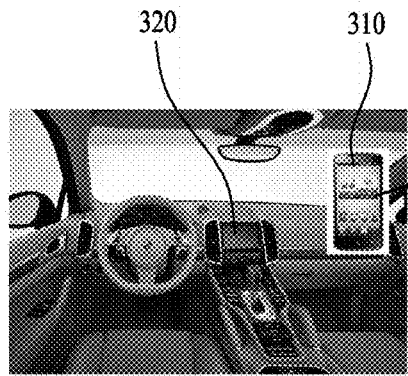
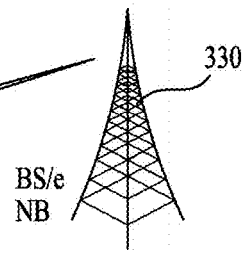

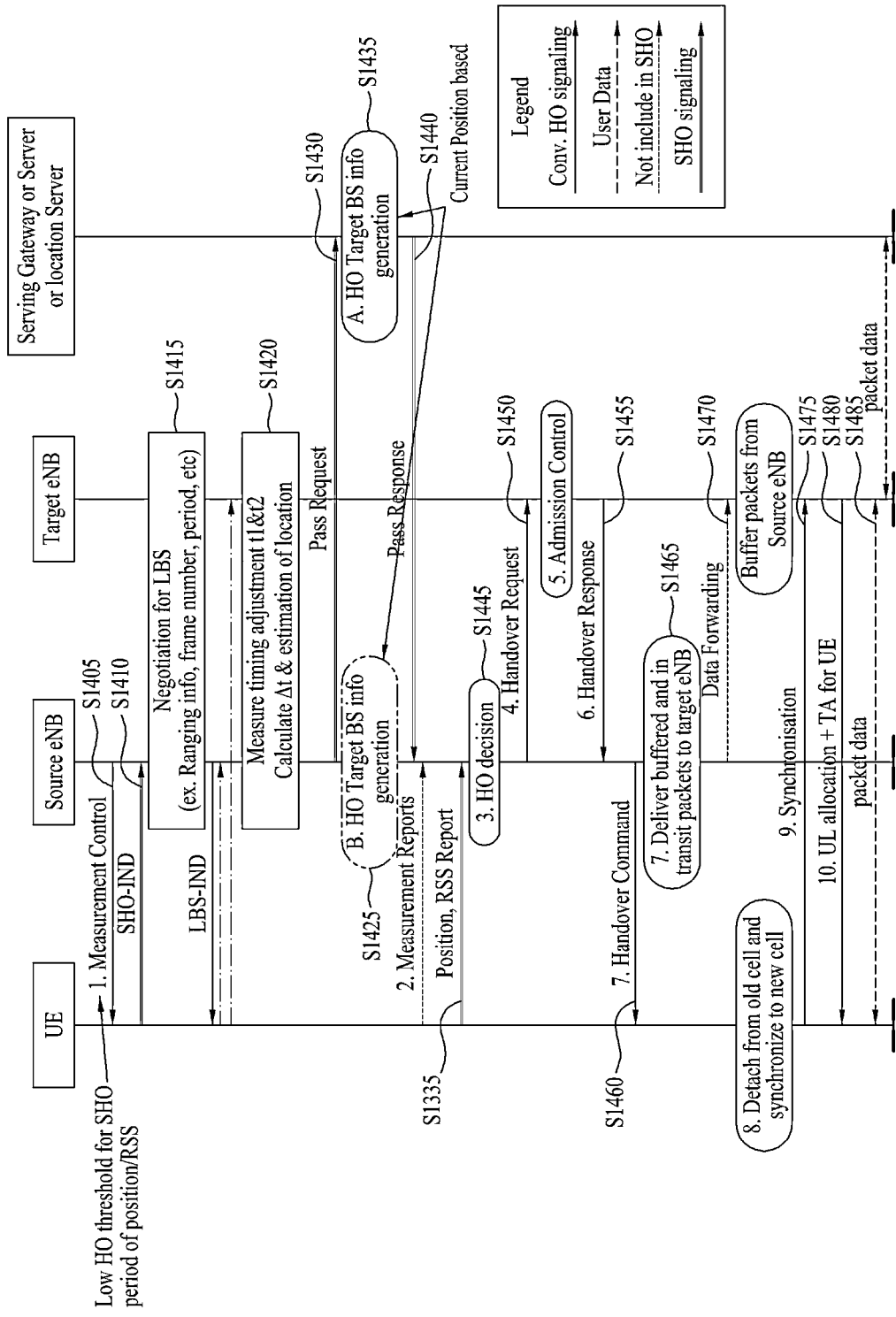

METHOD AND APPARATUS FOR PERFORMING HANDOVER USING PATH INFORMATION IN WIRELESS COMMUNICATION SYSTEM

This application claims the benefit of U.S. Ser. No. 61/604,531, filed on Feb. 29, 2012 and U.S. Ser. No. 61/611,533, filed on Mar. 15, 2012, which is hereby incorporated by reference as if fully set forth herein.

BACKGROUND OF THE INVENTION

1. Field of the Invention

The present invention relates to wireless communication, and more particularly, to a method and apparatus for performing handover using path information in a wireless communication system.

2. Discussion of the Related Art

Recently, a connected car is attracting considerable attention in various industrial fields such as the automotive industry or telecommunication industry. In the automotive industry, as a so-called "hyper-connected" age for seamlessly connecting persons or a person and an object has arrived, a car is regarded as a connectable device in addition to a smartphone, a smart pad, a TV, a game console and a robot. Therefore, cars have been developed that include an interactive system which is interconnected with various devices to share and utilize a service and content.

The connected car means a car connected to a network. The car may be changed to a service platform similarly to other smart apparatuses. Representative examples of the connected car include a car interconnected with a smartphone and is connected to a network using various methods such as 3G/4G or Wi-Fi.

The connected car is expected to rapidly have become a digital hub in the "hyper-connected" age. In the Japanese market, a low rate system of fixed monthly payment has already released and has been promoted as a public service. According to research by ABI, the number of cars having a connected car system mounted therein will increase from 45 million late in 2011 to 210 million in 2016 with an average annual increase of 36%.

In addition, recently, mobile carriers and car manufacturers have released various connected cars. "Onstar" of GM, "Connected Drive" of BMW, etc. use an original equipment manufacturing (OEM) type embedded system. A hybrid system which is installed in a factory, such as, vehicle tracking, toll payment, aftermarket solutions for providing an insurance function or "SYNC" of Ford, is attracting considerable attention.

Beforemarket systems of a connected car are expected to gain market dominance through a telematics service such as Blue Link and aftermarket systems of a connected car are expected to mainly implement various services while reducing communication cost by connecting devices including a smartphone in a car.

In general, a mobile terminal measures a signal of a peripheral base station and transmits a measurement result to a serving base station, if the strength of a signal received from a cell becomes weak. The mobile terminal performs blind detection in order to measure a signal of a neighboring base station. At this time, high power consumption occurs. Similarly, as a mobile terminal (e.g., a connected car) connected to a network moves, handover is required. For such handover, neighbor cell (or base station) measurement may be performed. However, when the mobile terminal performs measurement for handover in motion, a considerable problem occurs in terms of power consumption. A method for solving such a problem is disclosed in the present specification.

SUMMARY OF THE INVENTION

Accordingly, the present invention is directed to a method and apparatus for performing handover using path information in a wireless communication system that substantially obviates one or more problems due to limitations and disadvantages of the related art.

An object of the present invention is to provide a method for performing handover at a mobile terminal which moves along an established path in a wireless communication system.

Another object of the present invention is to provide a method for performing handover at a serving base station with respect to a mobile terminal which moves along an established path in a wireless communication system.

Another object of the present invention is to provide a method for performing handover at a core network node with respect to a mobile terminal which moves along a set movement path in a wireless communication system.

Another object of the present invention is to provide a mobile terminal for performing handover while moving along an established path in a wireless communication system.

Another object of the present invention is to provide a serving base station for performing handover with respect to a mobile terminal which moves along an established path in a wireless communication system.

Another object of the present invention is to provide a core network node for performing handover with respect to a mobile terminal which moves along an established path in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for performing a handover at a mobile terminal which moves along an established path in a wireless communication system includes transmitting an indicator indicating a handover type to a serving base station without performing measurement with respect to neighboring base stations and movement path information, and transmitting current position information of the mobile terminal to the serving base station. The method may further include receiving handover triggering threshold information corresponding to the handover type according to the indicator from the serving base station, and transmitting a received signal strength to the serving base station if the received signal strength of the serving base station is less than the handover triggering threshold. The movement path information may include information about a current position and a destination of the mobile terminal or the movement path information includes a decided movement path selected based on a current position and a destination of the mobile terminal.

In another aspect of the present invention, a method for performing a handover with respect to a mobile terminal which moves along an established path at a serving base station in a wireless communication system includes receiving an indicator indicating a handover type from the mobile terminal without performing measurement with respect to neighboring base stations and movement path information, transmitting the movement path information and the indicator to a core network node, receiving handover target base station information based on the movement path information from the core network node, receiving current position information from the mobile terminal, and determining whether handover is performed using the current position information and the handover target base station information. If the movement path information includes information about a current position and a destination of the mobile terminal, the handover target base station information may include information about a handover target base station on all paths according to the current position and the destination. If the movement path information includes a decided movement path selected based on a current position and a destination of the mobile terminal, the handover target base station information may include information about a handover target base station on the decided movement path. The core network node may correspond to a server, a position server or a serving gateway.

In another aspect of the present invention, a method for performing a handover with respect to a mobile terminal which moves along an established path at a core network node in a wireless communication system includes transmitting an indicator indicating a handover type from a serving base station to the core network node without performing measurement with respect to neighboring base stations and movement path information, generating handover target base station information based on the movement path information and the indicator, and transmitting the generated handover target base station information to the serving base station. If the movement path information includes information about a current position and a destination of the mobile terminal, information about a handover target base station on all paths according to the current position and the destination may be generated when generating the handover target base station information. If the movement path information includes a decided movement path selected based on a current position and a destination of the mobile terminal, information about a handover target base station on the decided movement path may be generated when generating the handover target base station information. The core network node may correspond to a server, a position server or a serving gateway.

In another aspect of the present invention, a mobile terminal for performing a handover while moving along an established path in a wireless communication system includes a transmitter; and a processor. The processor controls the transmitter to transmit an indicator indicating a handover type to a serving base station without performing measurement with respect to neighboring base stations and movement path information and to transmit current position information of the mobile terminal to the serving base station.

In another aspect of the present invention, a serving base station for performing a handover with respect to a mobile terminal which moves along an established path in a wireless communication system includes a receiver, a transmitter; and a processor. The processor controls the receiver to receive an indicator indicating a handover type from the mobile terminal without performing measurement with respect to neighboring base stations and movement path information, controls the transmitter to transmit the movement path information and the indicator to a core network node, controls the receiver to receive handover target base station information based on the movement path information from the core network node, and controls the receiver to receive current position information from the mobile terminal, and the processor determines whether handover is performed using the current position information and the handover target base station information.

In another aspect of the present invention, a core network node for performing a handover with respect to a mobile terminal which moves along an established path in a wireless communication system includes a transmitter and a processor. The processor controls the transmitter to transmit an indicator indicating a handover type from a serving base station to the core network node without performing measurement with respect to neighboring base stations and movement path information, generates handover target base station information based on the movement path information and the indicator, and controls the transmitter to transmit the generated handover target base station information to the serving base station.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating the concept of performing smart handover using a device connected to a cellular network in a connected car;

FIG. 3 is a diagram illustrating the concept of performing smart handover using a device connected to a cellular network in a connected car;

FIG. 14 is a diagram illustrating a process of performing smart handover using location information acquired through a location-based service (LBS).

DETAILED DESCRIPTION OF THE INVENTION

Figure 1:
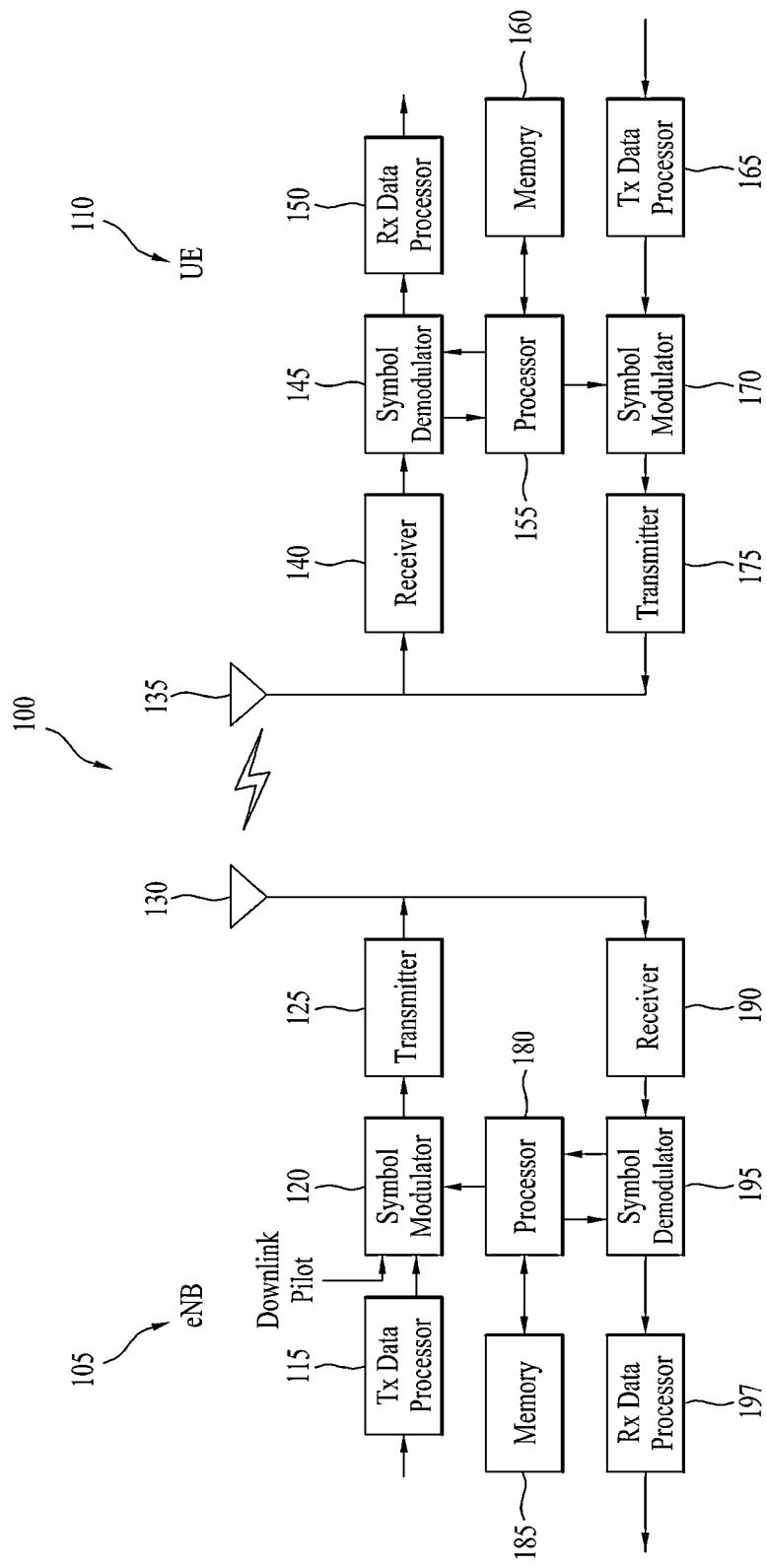
FIG. 1 is a block diagram showing the configurations of a base station 105 and a terminal 110 in a wireless communication system 100.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details. For example, in the following description, the following description will be made on the assumption that a mobile communication system is a 3GPP LTE or LTE-A system, but the present invention is applicable to other mobile communication systems excluding the unique matters of the 3GPP LTE or LTE-A system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, it is assumed that a terminal includes a mobile or fixed user end device such as a user equipment (UE), a mobile station (MS), and an advanced mobile station (AMS) and a base station includes a node of a network end communicating with a terminal, such as a Node-B, an eNode B, a base station and an access point (AP). Although the description is made based on an IEEE 802.16 system in the present invention, the present invention is applicable to other various communication methods.

In a mobile communication system, a terminal (user equipment; UE) may receive information from a base station in downlink and may transmit information in uplink. Information transmitted or received by the UE includes data and a variety of control information and a physical channel may be variously changed according to the kind and usage of information transmitted or received by the UE.

The following embodiments of the present invention can be applied to a variety of radio access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied with wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of the E-UMTS (Evolved UMTS), which uses E-UTRA. 3GPP LTE employs the OFDMA in downlink and employs the SC-FDMA in uplink. The LTE—Advanced (LTE-A) is an evolved version of the 3GPP LTE.

It should be noted that specific terms used in the following description are proposed for the convenience of description and better understanding of the present invention, and the use of these specific terms may be changed to another format within the technical scope or spirit of the present invention.

FIG. 1 is a block diagram showing the configurations of a base station (eNB) 105 and a terminal 110 in a wireless communication system 100.

Although one eNB 105 (including a core network node) and one UE 110 are shown in order to simplify the configuration of the wireless communication system 100, the wireless communication system 100 may include one or more eNBs and/or one or more UEs.

Referring to FIG. 1, the eNB 105 may include a transmission (Tx) data processor 115, a symbol modulator 120, a transmitter 125, a transmit/receive antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmit/receive antenna 135, a processor 155, a memory 160, a receiver 140, a symbol demodulator 155, and an Rx data processor 150. Although one antenna 130 and one antenna 135 are respectively included in the eNB 105 and the UE 110, each of the eNB 105 and the UE 110 includes a plurality of antennas. Accordingly, the eNB 105 and the UE 110 according to the present invention support a Multiple Input Multiple Output (MIMO) system. The eNB 105 and the UE 110 according to the present invention support both a Single User-MIMO (SU-MIMO) scheme and a Multi User-MIMO (MU-MIMO) scheme.

In downlink, the Tx data processor 115 receives traffic data, formats and codes the received traffic data, interleaves and modulates the coded traffic data (or performs symbol mapping), and provides modulated symbols ("data symbols"). The symbol modulator 120 receives and processes the data symbols and pilot symbols and provides a symbol stream.

The symbol modulator 120 multiplexes data and pilot signals and transmits the multiplexed data to the transmitter 125. At this time, the transmitted symbols may be data symbols, pilot symbols or zero signal values. In each symbol period, the pilot symbols may be consecutively transmitted. The pilot symbols may be Frequency Division Multiplexed (FDM), Orthogonal Frequency Division Multiplexed (OFDM), Time Division Multiplexed (TDM) or Code Division Multiplexed (CDM) symbols.

The transmitter 125 receives and converts the symbol stream into one or more analog signals, additionally adjusts (e.g., amplifies, filters, and frequency-up-converts) the analog signals, and generates a downlink signal suitable for transmission through a radio channel. Subsequently, the downlink signal is transmitted to the UE through the antenna 130.

In the UE 110, the receive antenna 135 receives the downlink signal from the eNB and provides the received signal to the receiver 140. The receiver 140 adjusts (e.g., filters, amplifies, frequency-down-converts) the received signal and digitizes the adjusted signal so as to acquire samples. The symbol demodulator 145 demodulates the received pilot symbols and provides the demodulated pilot symbols to the processor 155, for channel estimation.

The symbol demodulator 145 receives downlink frequency response estimation values from the processor 155, performs data demodulation with respect to the received data symbols, acquires data symbol estimation values (which are estimation values of the transmitted data symbols), and provides the data symbol estimation values to the Rx data processor 150. The Rx data processor 150 demodulates (that is, symbol-demaps and deinterleaves) the data symbol estimation values, decodes the demodulated values, and restores transmitted traffic data.

The processes performed by the symbol demodulator 145 and the Rx data processor 150 are complementary to the processes performed by the symbol modulator 120 and the Tx data processor 115 of the eNB 105.

In the UE 110, in uplink, the Tx data processor 165 processes the traffic data and provides data symbols. The symbol modulator 170 receives the data symbols, multiplexes the data symbols, performs modulation with respect to the symbols and provides a symbol stream to the transmitter 175. The transmitter 175 receives and processes the symbol stream, generates an uplink signal, and transmits the uplink signal to the eNB 105 through the transmit antenna 135.

The eNB 105 receives the uplink signal from the UE 110 through the receive antenna 130 and the receiver 190 processes the received uplink signal and acquires samples. Subsequently, the symbol demodulator 195 processes the samples and provides pilot symbols and data symbol estimation values received in uplink. The Rx data processor 197 processes the data symbol estimation values and restores traffic data transmitted from the UE 110.

The respective processors 155 and 180 of the UE 110 and the eNB 105 instruct (e.g., control, adjust, manages, etc.) the respective operations of the UE 110 and the eNB 105. The processors 155 and 180 may be connected to the memories 160 and 185 for storing program codes and data. The memories 160 and 185 may be respectively connected to the processors 155 and 180 so as to store operating systems, applications and general files.

Each of the processors 155 and 180 may also be referred to as a controller, a microcontroller, a microprocessor, a microcomputer, etc. The processors 155 and 180 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 155 and 180.

If the embodiments of the present invention are implemented by firmware or software, the firmware or software may be configured to include modules, procedures, functions, etc. for performing the functions or operations of the present invention. The firmware or software configured to perform the present invention may be included in the processors 155 and 180 or may be stored in the memories 160 and 185 so as to be driven by the processors 155 and 180.

Layers of the radio interface protocol between the UE and the eNB in the wireless communication system (network) may be classified into a first layer (L1), a second layer (L2) and a third layer (L3) based on the three low-level layers of the well-known Open System Interconnection (OSI) model of a communication system. A physical layer belongs to the first layer and provides an information transport service through a physical channel. A Radio Resource Control (RRC) layer belongs to the third layer and provides control radio resources between the UE and the network. The UE and the eNB exchange RRC messages with each other through a wireless communication network and the RRC layer.

FIG. 2 is a diagram illustrating the concept of performing smart handover using a device connected to a cellular network in a connected car.

Referring to FIG. 2, a navigation device or a telematics device 210 which may be connected to a cellular network is present in the connected car. When this device 210 is powered on, the device 210 may display an operation mode on a screen. At this time, smart handover may be automatically performed along with a navigation function. In addition, when the device 210 is switched from off to on or from an idle state to an active state, it may indicate whether smart handover is performed when accessing the eNB.

A user may select an operation mode displayed on the screen of the device 210 so as to execute navigation software (navigation application/navigation program) of the device, for example, using voice input, touch (press, or pressing and sliding operation), motion, etc. Smart handover may be included in a navigation operation or may be performed independently of a navigation operation and may be selectively performed by supporting multiple operations of the device 210.

FIG. 3 is a diagram illustrating the concept of performing smart handover using a device connected to a cellular network in a connected car.

Referring to FIG. 3, it is possible to perform discovery and connection between a navigation device or a telematics device 320 of a car and a cellular terminal when a user having a cellular terminal 310 rides in a car. FIG. 3 shows the case in which the telematics device 320 is not directly connected to a base station (eNB) 330 but a link with the cellular terminal 310 of the car is established so as to perform communication with the base station (eNB) 330 through the cellular terminal 310. For example, a link with the base station may be established through a method such as tethering of a terminal.

When a user rides in a car, a connection between devices may start when the car starts up or when a battery is turned on. A link may be established between the cellular terminal 310 and the telematics device 320 using a short-range wireless system. For example, a link may be automatically established after discovery through a system such as ZigBee, Bluetooth, LR-UWB, or Wi-Fi. The cellular terminal 310 or the linked device 320 is informed that the link with the device has been established.

In addition, the cellular terminal 310 may display connection with the navigation device 320 checked through sensing. The device 320 checked through discovery is displayed and selected by the user, thereby establishing a connection. A link may be established by bringing a module mounted in the car, such as a tag or a near field communication (NFC) module, into contact with the cellular terminal 310. Since connection information, a service and an operation mode are stored in a module, a stored operation may be simply performed through contact or touch. After establishing a connection, an operation mode or a service mode which may be performed by the device 320 or the device may be displayed.

The user selects a displayed mode through touch or voice input so as to perform the operation. If the device is displayed, the device may be selected through touch or voice input and the operation of the device may be displayed and selected after selecting the device. Operation selection may be performed through touch, voice input, motion, etc. A connection between devices may be automatically established when the telematics device of the car is positioned.

Figure 4:
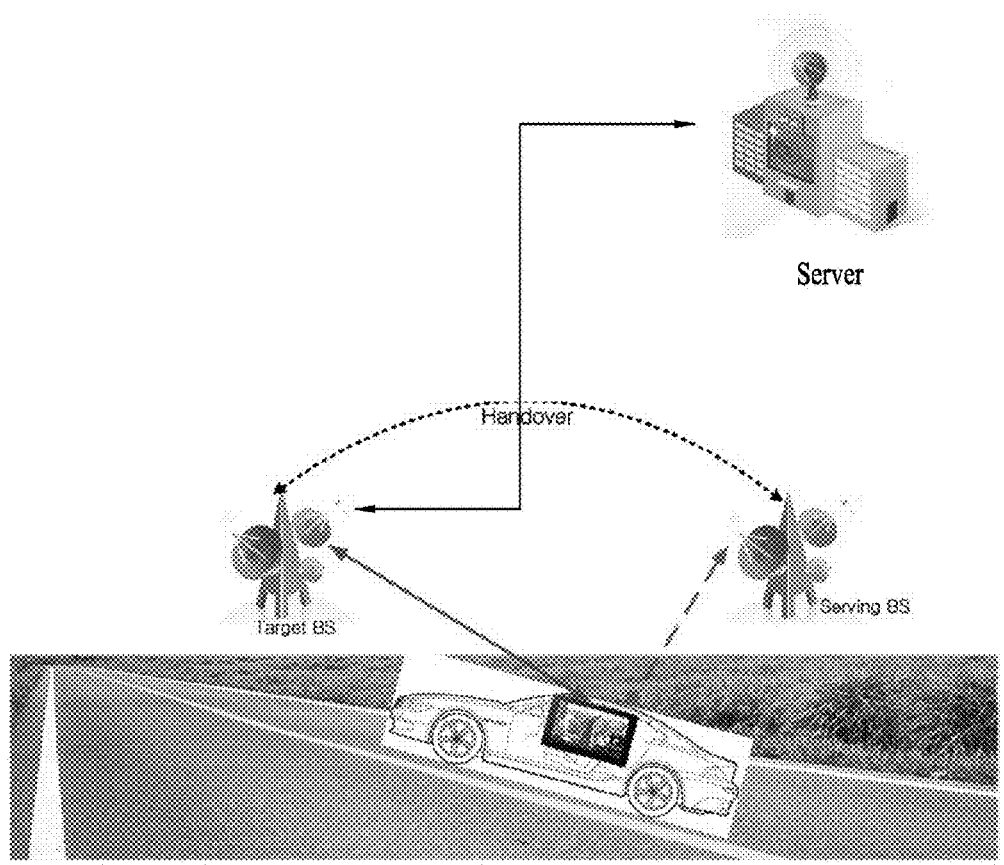
FIG. 4 is a diagram illustrating the concept of performing smart handover using a device connected to a cellular network in a connected car.

FIG. 4 is a diagram illustrating the concept of performing smart handover using a device connected to a cellular network in a connected car.

Referring to FIG. 4, smart handover may be performed in the connected car using position information of a mobile terminal. At this time, the position information may be acquired through a global positioning system (GPS) or a location-based service (LBS). The mobile terminal is placed in the car and is brought into contact with an in-vehicle tag or is scanned through the in-vehicle tag, thereby establishing a path through the mobile terminal.

Figure 5:
FIG. 5 is a diagram showing a first scenario for smart handover in a connected car.

FIG. 5 is a diagram showing a first scenario for smart handover in a connected car.

Referring to FIG. 5, it is possible to perform discovery and connection between a navigation device or a telematics device 520 and a cellular terminal when a user having the cellular terminal 510 rides in a car. At this time, discovery and connection may be performed using a short-range transmission system (e.g., NFC, radio frequency identification (RFID), ZigBee or Bluetooth) or Wi-Fi. Through scanning between devices, the cellular terminal 510 can discover the telematics device 520 or the telematics device 520 may discover the cellular terminal 510.

A connection between devices may start when a user starts up a car. If a user performs initial registration to share information between devices, a connection is immediately performed without discovery (log information transmission and reception). After the device is recognized through discovery, auto-connection may be performed. In order to prevent connection to another user equipment, a dedicated key may be used. A connection to a device is displayed on a display unit of the device.

The cellular terminal 510 may receive real-time traffic information of a path from a base station and transmit the real-time traffic information to the telematics device 520, thereby correcting a movement path.

If the user establishes a path through the telematics device 520 mounted in the car, the telematics device 520 transmits path information to the cellular terminal 510 through a service request tracking system (SRTS). At this time, path information may include initial information (path start point or path end point), selected path information (PI). The cellular terminal 510 which receives the path information from the telematics device 520 sends the path information to a serving base station. The path information may be transmitted to the serving base station (SBS) using a control channel or in a data format.

If a connection between the cellular terminal 510 and the device has been completed, the telematics device 520 may transmit current position information (CPI) acquired through a GPS or an LBS to the cellular terminal 510 using a service request tracking system (SRTS). Such transmission may be periodically performed and the cellular terminal 510 which receives the CPI from the telematics device 520 transmits the information to the serving base station. At this time, the information may be transmitted via a control channel or a data channel.

A process of the cases in which initial registration is performed and is not performed will now be described in association with FIG. 5.

Case in which Initial Registration is Performed

A user registers the cellular terminal 510 with the telematics device 520 or registers the telematics device 520 with the cellular terminal 510. Through this registration, these devices store information about the registered device (log information generation). Upon registration, ZigBee, Bluetooth, RFID, Wi-Fi direct, etc. may be used or the terminal may be connected through Bluetooth in the car using a conventional method. Through transmission and reception of the log information stored in the cellular terminal 510 and the telematics device 520, device discovery and connection may be performed. After performing connection, the connection between the devices may be displayed on the display of the device.

When the user discovers a path through the telematics device 520, the telematics device 520 transmits path information to the cellular terminal 510. The path information may include information about a selected path and information about a start point, an end point and an operation mode. In this case, the telematics device 520 and the base station must have the same navigation software (e.g., a map, a mapping algorithm, etc.), that is, unified navigation firmware must be used. If information about all selected paths is transmitted, the amount of data may be increased. Therefore, only the path information corresponding to a selected operation mode may be transmitted to the cellular terminal 510 using ZigBee, Bluetooth, RFID, etc. between the devices 510 and 520. If a path is not established after connection, the telematics device 520 transmits current position information acquired through a GPS to the cellular terminal 510.

Case in which Initial Registration is not Performed

The cellular terminal 510 and the telematics device 520 may detect each device through discovery. Device discovery may be performed by transmitting and receiving a discovery signal between devices using Bluetooth, ZigBee, and Wi-Fi direct system. Whenever the user rides in a car, discovery may be performed between the cellular terminal 510 and the telematics device 520. The cellular terminal 510 and the telematics device 520 which discover another device may display the discovered device. The discovered device may be displayed on the display in the form of a list or an icon. Alternatively, the discovered device may be output as sound. The user may select a device to be connected by touching the displayed list or icon or through voice input. If the user connects the devices, the telematics device 520 transmits position information to the cellular terminal 510. If path establishment of the user is triggered, path information is transmitted and, if path establishment is not performed, current position information is transmitted. For automatic discovery and connection, a service request tracking system (SRTS) of a device remains on at all times.

Figure 6:
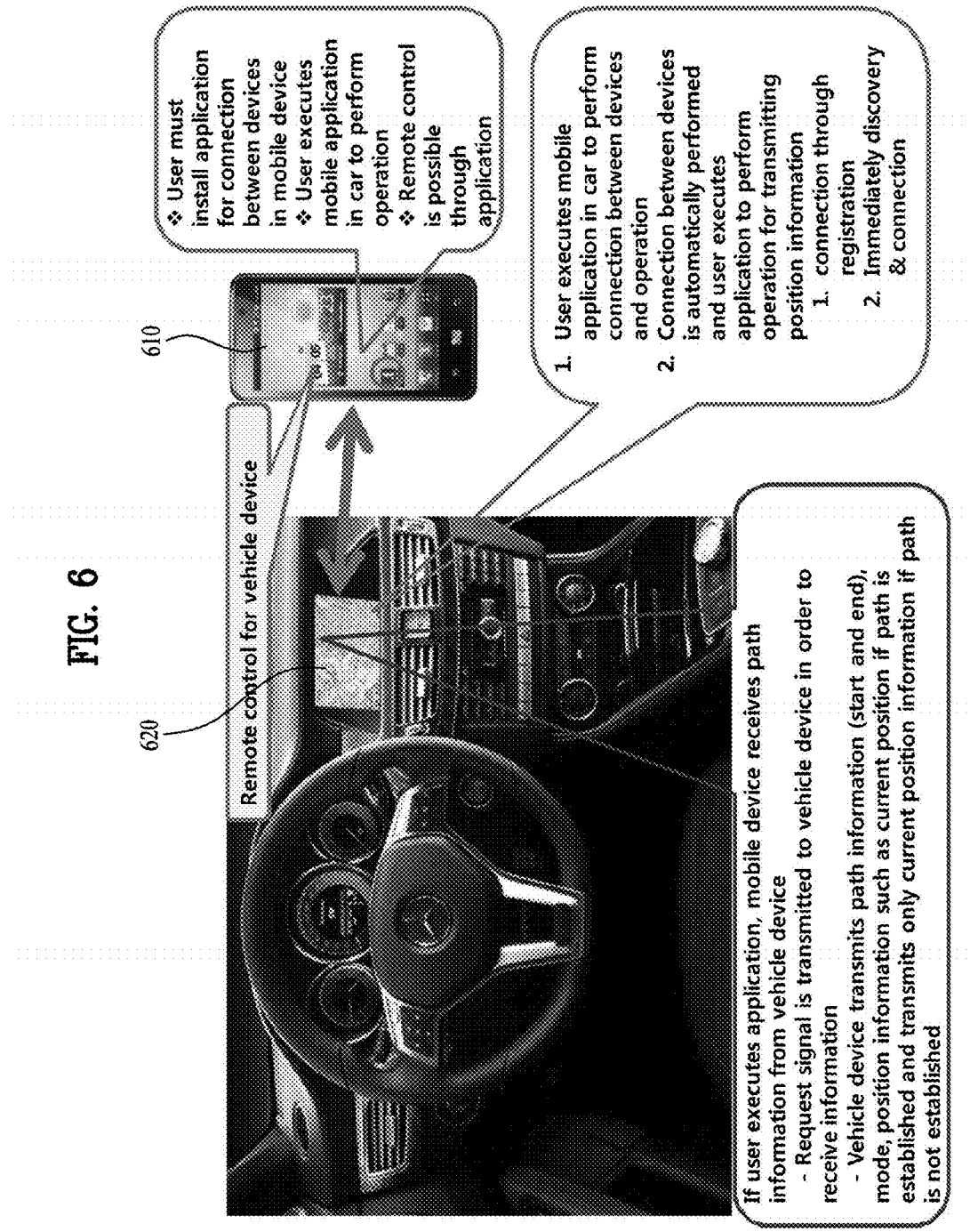
FIG. 6 is a diagram showing a second scenario for smart handover in a connected car.

FIG. 6 is a diagram showing a second scenario for smart handover in a connected car.

The scenario shown in FIG. 6 relates to a connection and operation using a mobile application of a cellular terminal 610. The user assumes that an application for connecting devices is installed in the cellular terminal 610. The user executes the mobile application of the cellular terminal 610 in a car so as to perform operation. As shown in FIG. 6, remote control is possible through the mobile application.

The devices (the cellular terminal 620 and the telematics device 620) are automatically connected and the user executes an application so as to perform an operation for transmitting position information. A connection method includes a connection method through registration and an immediate discovery and connection method.

If the user executes the mobile application, the cellular terminal 610 may receive path information from the telematics device 620. In order to receive the path information, the cellular terminal 610 may transmit a request signal to the telematics device 620. The telematics device 620 may transmit path information (a start point and an end point), a mode and position information including a current position, if the path is established. However, if the path is not established, only current position information may be transmitted.

A process associated with FIG. 6 will be described. An application for connection with the telematics device 620 is installed in the cellular terminal 610. A user who rides in a car executes the mobile application installed in the cellular terminal 610. At this time, the mobile application is executed through voice input, touch, contact, etc. A device discovery procedure is performed by executing the mobile application in the car. The discovered device is displayed on the display of the cellular terminal 610 and the user selects a device to be connected through voice input, touch, contact, etc. to connect the cellular terminal with the device. If a tag or NFC module is used, the mobile application is executed and then the cellular terminal 610 is brought into contact with the tag and NFC module, thereby establishing a connection.

If the connection has been established, services to be used by the user may be displayed through the connection between the cellular terminal 610 and the telematics device 620. A position recognition operation (e.g., smart handover (SHO), a remote control operation and a telematic operation may be performed. After the connection has been established, the cellular terminal 610 may automatically receive position information from the telematics device 20 without user selection.

According to user selection, the cellular terminal 610 may receive position information from the telematics device 620. The telematics device 620 transmits path information if the path is established and transmits only current position information if the path is not established. The cellular terminal 610 which receives the position information or the path information from the telematics device 620 transmits the information to a serving base station.

Figure 7:
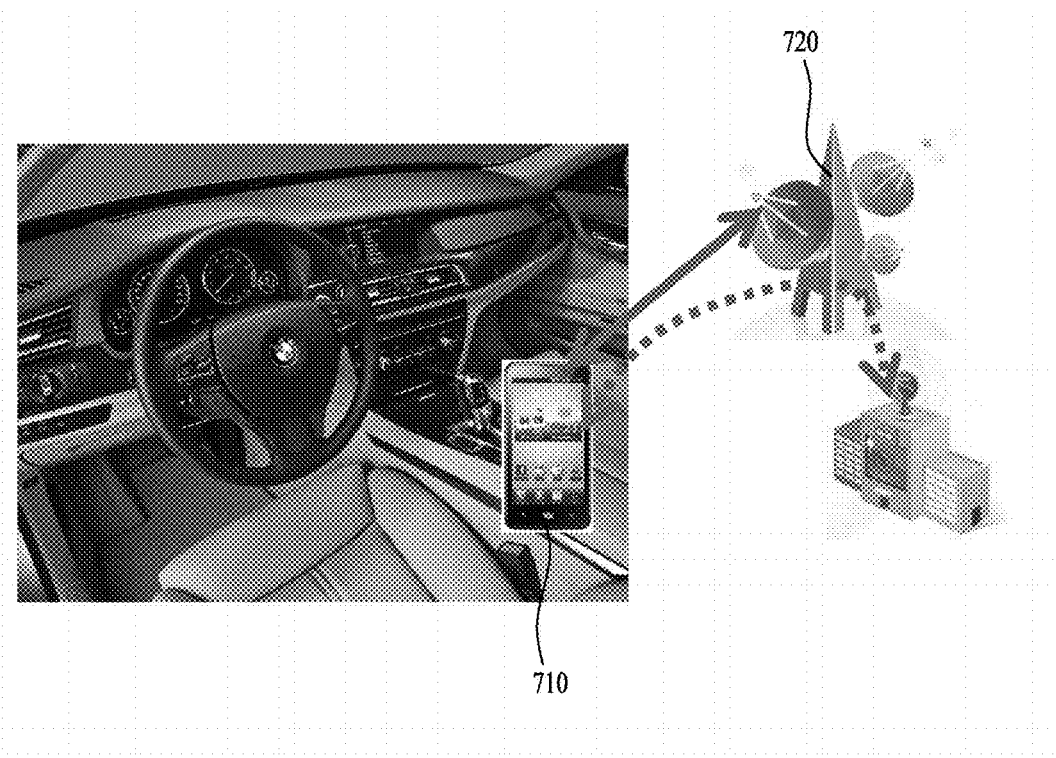
FIG. 7 is a diagram showing a third scenario for smart handover in a connected car.

FIG. 7 is a diagram showing a third scenario for smart handover in a connected car.

FIG. 7 illustrates operation using a position service of a cellular terminal 710. A user executes a navigation application of the cellular terminal 710 (e.g., a smartphone). After the navigation application is executed, acquired path information, current position information, etc. may be transmitted to a serving base station, assuming that the user subscribes to a navigation service.

The service base station 720 transmits position information received from the terminal to a higher server/gateway or a higher base station, receives or generates information about a handover target base station, and transmits the information to the terminal. At this time, traffic information may be transmitted along with the information about the target base station.

A process of the scenario associated with FIG. 7 will be described. A position-associated program is executed through the cellular terminal 710. A navigation application and a position service application are executed. Smart handover (SHO) may start through the executed applications. If a location/positioning program (PG) is executed, SHO may be automatically performed or may be selectively performed depending on whether SHO in the executed program is performed or not. The cellular terminal 710 transmits acquired location/position information to the serving base station 720. The serving base station transmits information about SHO to the cellular terminal 720.

A procedure of performing SHO according to such scenarios will now be described in detail. Prior to describing various embodiments, the concept of SHO will be briefly described. SHO means that a device of a connected car enters a target base station using information about a handover target base station on a path received from a serving base station without a measurement and initial process. Hereinafter, in association with a method of performing SHO, the case in which the user establishes a navigation path and the case in which the user does not establish a navigation path will both be described.

Case in which a User Establishes a Navigation Path

Figure 8:
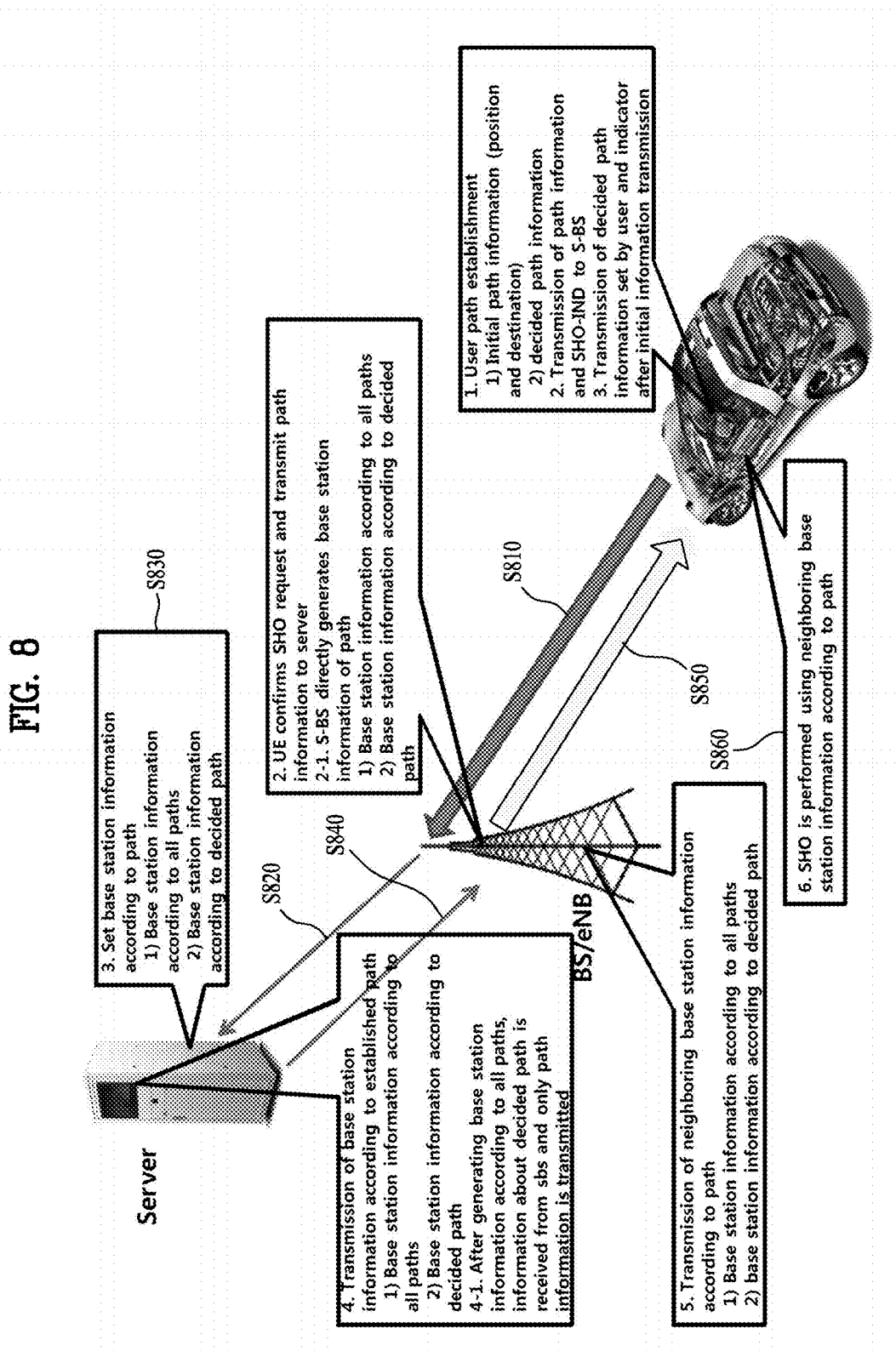
FIG. 8 is a diagram illustrating a process of performing smart handover in a connected car.

FIG. 8 is a diagram illustrating a process of performing smart handover in a connected car.

In FIG. 8, user path establishment information of a path set by a user is transmitted through a device (a telematics device or a in-vehicle cellular terminal) of a connected car (S810). At this time, the user path establishment information includes initial path information and decided path information and only initial path information may be transmitted. The initial path information may include a position, a destination and an indicator (hereinafter, referred to as a smart handover indicator) indicating whether smart handover is performed or may include routing information (from a start point to an end point) and a smart handover indicator. Such path information (position and destination) may be transmitted via a data channel. The initial path information may be transmitted first and then the decided path information set by the user and an indicator may be transmitted.

The serving base station which receives the path information and the smart handover indicator from the device of the connected car transmits the path information and the smart handover indicator to a server (e.g., a position server, a gateway, etc.) (S820). The position information included in the received path information may be immediately transmitted to the server (or the position server) so as to generate handover target base station information according to the path.

Then, the server may generate base station information based on the path information received from the serving base station (S830). At this time, the base station information according to all paths may be generated and the base station information according to a decided path may be generated. The server may generate handover target base station information with respect to all paths from a start point to a destination point.

Thereafter, the server transmits the base station information according to the path to the serving base station (S840). At this time, the transmitted information may include base station information generated according to all paths and base station information generated according to a decided path. Alternatively, the base station information generated according to all paths may be generated, information about the decided path may be received from the serving base station, and only the information about the dedicated path may be transmitted. The server transmits handover target base station information generated according to paths to the serving base station.

Then, the serving base station may transmit neighboring base station information (that is, handover target base station information) according to the path to the device of the connected car (S850). The neighboring base station information may include base station information generated with respect to all paths and base station information generated with respect to a decided path. The serving base station transmits the handover target base station information according to paths to the connected device which transmits the smart handover indicator or the path information. The information may be transmitted to the device through a data channel or a separate channel.

Thereafter, the device of the connected car may perform smart handover based on the base station information according to the path, which is received from the serving base station, without measuring peripheral base stations (S860).

Although the case in which the server generates the handover target base station information according to the path is described in FIG. 8, the serving base station may generate the handover target base station information according to paths using the information received from the device of the connected car.

In FIG. 8, the handover target base station information according to paths may be transmitted to the device of the connected car such that the device of the connected car may use the handover target base station information of the path established by the user. The device of the connected car may transmit information about the path established by the user (e.g., an optimal path, a free path, a shortest path, etc.) to the serving base station after initial path information transmission and the serving base station may transmit only the received handover target base station information of the path to the device of the connected car.

The smart handover operation may be performed not only through an embedded device or a stationary device of a car but also through a mobile cellular terminal. If the mobile cellular terminal is used, a connection between devices is not required and location/position information obtained through the mobile cellular terminal may be directly transmitted to a base station or a position server. Operation may start by executing a location/positioning service or a program (e.g., a navigation program) of the mobile cellular terminal.

Case in which Information about the Decided Path Established by the User is Transmitted The device of the connected car may transmit the information about the decided path to the serving base station. The selected specific path information/path mode and smart handover indicator are transmitted. At this time, the device of the connected car may transmit the information through a data channel or may configure a channel for transmitting path information and transmit the information to the serving base station through the channel. The serving base station which receives the path information from the device of the connected car may transmit the information to the server (or the gateway or the position server) or directly create a handover target base station list of the path. The server which receives the path information from the serving base station generates and transmits the handover target base station information of the path to the serving base station. The serving base station which receives the handover target base station information according to the path from the server or directly generates the handover target base station information may transmit the handover target base station information to the device of the connected car. At this time, the handover target base station information may be transmitted through downlink data or a downlink channel for transmitting the path information.

Update of Handover Target Base Station Information Upon Path Change

1. Update of handover target information through event triggering (see FIG. 11).

If a user reestablishes a path or if a path is reestablished according to path establishment change or path deviation based on real-time traffic information, an event is triggered. The device of the connected car needs to transmit information about a new path to the serving base station if the event occurs. The path information may include at least one of current position information, destination information and path mode information. In addition, a path change indication signal, current position information and destination information (which may not be transmitted if the serving base station stores the information) needs to be transmitted. The serving base station which receives the path information from the device of the connected car may generate and transmit the handover target base station information of the path to the device of the connected car. In order to rapidly update the path information, the serving base station may allocate dedicated resources to the device of the connected car. The device of the connected car may rapidly transmit changed path information and a path change indicator to the serving base station using resources/channel allocated by the serving base station if the event occurs.

2. Periodic path information transmission (see FIG. 12)

The device of the connected car which receives the information about the handover target base station on the path and a path information-reporting period from the serving base station needs to transmit the path information to the serving base station with the period. At this time, at least one of current position information and established path information may be transmitted. The period information for transmitting the position information may be received along with the handover target base station information or may be received upon accessing the base station. The serving base station may allocate resources or channel for transmitting periodic path information to the device of the connected car and the device of the connected car may transmit the information to the serving base station through the allocated resources or channel. The path information received from the device of the connected car may be compared with the path information transmitted to the connected device or a determination as to whether the device of the connected car is located on the path is made, thereby setting a handover target base station on the path based on the received information.

The serving base station may check path deviation through the reported current position. The serving base station checks whether the received path information is different from previous path information. The serving base station may transmit information about newly generated handover target base stations to the device of the connected car if the information about the handover target base station information is changed or if the device of the connected car deviates from the path. If the path is not changed or path deviation does not occur, the serving base station does not need to change the information about the handover target base station. Thus, the serving base station transmits only an ACK signal to the device of the connected car. If path change or path deviation occurs, the serving base station may transmit the information about the handover target base station according to a reestablished path to the device of the connected car. The serving base station transmits the information about the changed handover target base station through downlink data or transmits the information about the changed handover target base station and an update/change indicator together such that the device of the connected car changes the information about the handover target base station. The device of the connected car which receives the information about the handover target base station according to path change updates the information about the handover target base station and reports current position and path information to the serving base station with a predetermined period.

The path information transmitted from the serving base station to the device of the connected car may include handover target base station information (a cell ID and a preamble index) for handover at a specific path/location among neighboring base stations on the path, information about a handover start point of the device of the connected car and information about a position where handover is performed. The handover target base station information may be information about a single base station for performing handover on a specific path.

The serving base station may not transmit the information about the handover target base station but may store the information about the handover target base station. Only information about a handover target base station of a current position may be transmitted using the current position information (periodically or according to a base station request) transmitted by the device of the connected car or information about a handover target base station may be transmitted if a handover time or location is reached. The serving base station having the information about the handover target base station may transmit, to the target base station, information about an estimated arrival time of the device of the connected car, device information of the connected car (e.g., ID and QoS), service priority and an entry indication of the device of the connected car to be used for scheduling and access control of the device of the connected car within the cell of the target base station.

The target base station which receives the information such as the device information and the estimated arrival time information of the device of the connected car which enters the serving base station may apply a time offset to set ranging code allocation, resource allocation, etc. for handover before the estimated arrival time and transmit the allocation information to the serving base station or generate and transmit, to the serving base station, information about handover using the estimated information after receiving the signal. The server may receive the path information from the serving base station and generate and transmit handover target base station information to the serving base station. In order to reduce errors in the estimated time due to estimated time delay or reduction of the path, the device of the connected car periodically transmits current position information and the serving base station measures and consistently updates the estimated time through the current position information. The measured estimated time may be averaged and used.

Figure 9:
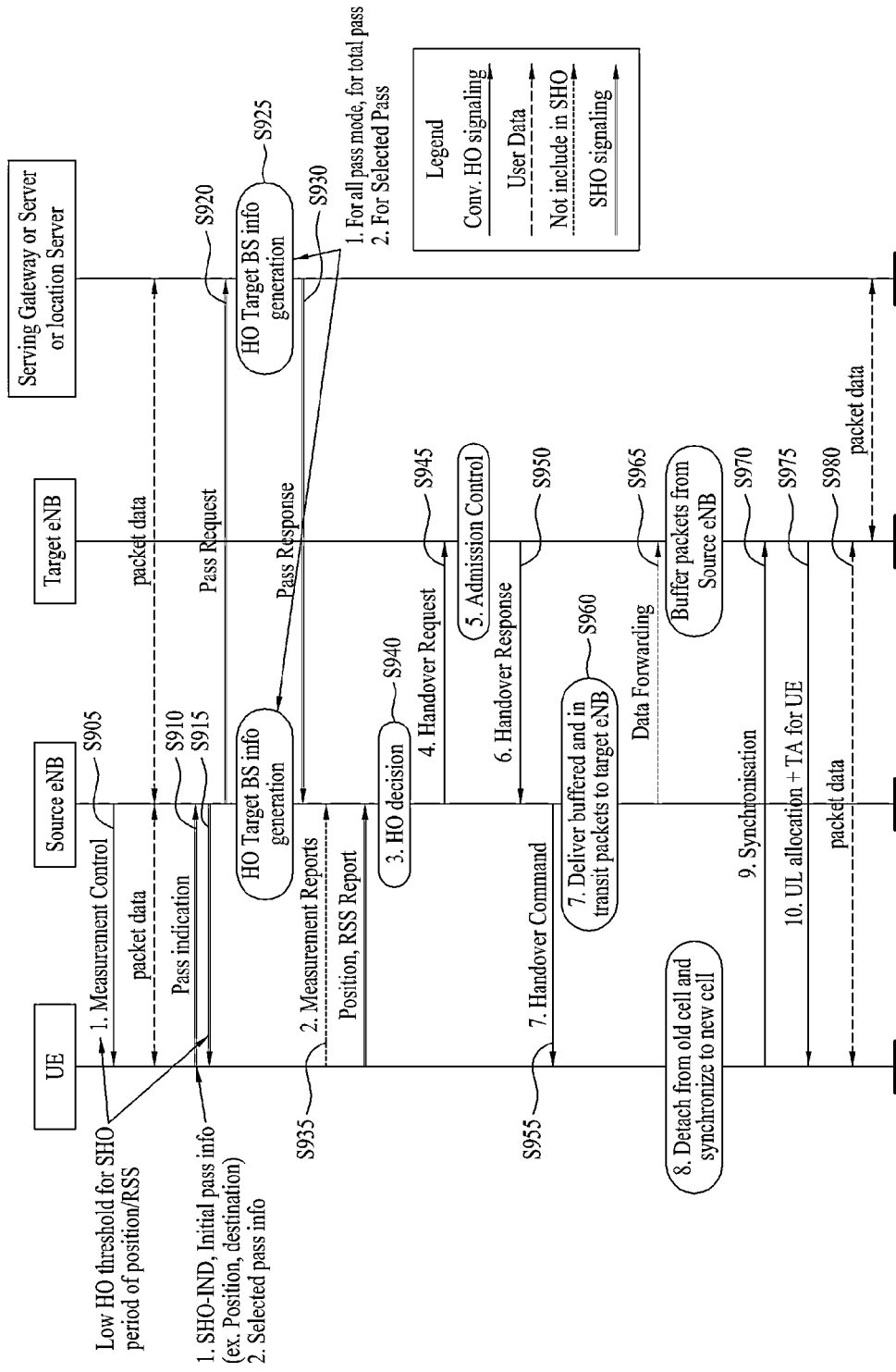
FIG. 9 is a diagram illustrating a process of performing smart handover when a serving base station determines whether handover is performed.

FIG. 9 is a diagram illustrating a process of performing smart handover when a serving base station determines whether handover is performed.

Referring to FIG. 9, a serving base station (a source eNB or a serving eNB) transmits measurement control information for measurement and reporting performed for handover with respect to a mobile terminal (UE) (S905). The UE transmits path information (path indication) of a path to be moved to the serving base station (S910). At this time, the path information transmitted from the UE to the serving base station may include a smart handover indicator (SHO-IND) indicating that smart handover is performed and initial path establishment information. The initial path establishment information may include position and destination information. The UE may further transmit selected specific path information to the serving base station.

Thereafter, the serving base station may transmit handover triggering threshold information for smart handover (SHO) to the UE (S915). The handover triggering threshold for smart handover may be set to be lower than a threshold (e.g., the received signal strengths of neighboring base stations to be measured) for triggering normal handover of a cellular terminal. If a smart handover indicator is received, the serving base station may set a low handover triggering threshold and inform the UE of the low handover triggering threshold. Alternatively, the serving base station may set a low handover triggering threshold when the UE enters the serving base station and transmit the low handover triggering threshold to the UE in step S905.

The serving base station may differently set and transmit the handover triggering threshold according to UEs within the cell to each UE. The UE which performs smart handover may reduce measurement and reporting for handover within the cell without the indication of the serving base station, thereby reducing power consumption of the UE.

The serving base station sends the path information received from the UE to the server (or a serving gateway or a position server) (that is, a core network node) through a path request message (S920).

The server may generate information about a handover target base station on the path based on the received path information (S925) and transmit the handover target base station information to the serving base station through a path response message (S930). The server may generate handover target base station information of all paths or generate handover target base station information of a selected specific path. Alternatively, the serving base station may generate information about the handover target base station on the path using the path information received from the UE.

Thereafter, the UE transmits current position information to the serving base station (S935). At this time, a received signal strength (RSS) (a received signal strength from the target base station and/or a received signal strength from the serving base station) may also be transmitted to the serving base station. At this time, the received signal strength may be transmitted only when a predetermined handover triggering threshold for smart handover is reached.

Then, the serving base station may determine whether the UE is handed over using the current position of the UE and the information about the handover target base station (S940). The serving base station may determine whether the UE is handed over using an estimated time when the UE enters the target base station through the current position information transmitted by the UE.

The subsequent handover process is similar to the conventional handover process of a cellular network and thus will be briefly described. If it is determined that handover is performed, the serving base station transmits a handover request message HO-REQ to the target base station (target eNB) (S945). At this time, a handover request, information about the UE and estimated entry time information through path information may be further transmitted.

The target base station which receives the handover request transmits a dedicated ranging (RNG) code, resource allocation (RA) information, a time offset, etc. to the serving base station through a handover response HO_RSP, for quick access (S950). Thereafter, the serving base station transmits a handover command message to the UE (S955). The handover command message may include the dedicated ranging code, the resource allocation information, target base station ID, a time adjustment value, etc., which are received from the target base station. The UE may perform handover to the target base station through contention-free ranging using the dedicated ranging code included in the received handover information. The UE may not perform measurement and reporting for handover but may receive only a handover command message from the base station to perform handover.

After the handover command has been transmitted, the serving base station does not transmit user traffic. If user traffic which is not transmitted using a radio interval is present, the serving base station buffers user traffic (S960). The user traffic buffered by the serving base station is transmitted to the target base station (S965). That is, the serving base station forwards the data stored in a buffer to the target base station (S965).

The UE may synchronize with the target base station (S970), receive uplink resource allocation information for the UE from the target base station (S975), and exchange packet data with the target base station (S980).

Unlike the handover process of FIG. 9, the serving base station may transmit a handover triggering threshold for smart handover to the UE which performs smart handover through a downlink signal. The smart handover triggering threshold may be allocated through negotiation when the UE enters the serving base station or may be transmitted to the UE which performs smart handover through a downlink signal through a smart handover indication of the UE. The UE which receives the smart handover triggering threshold from the serving base station or performs smart handover may use the smart handover triggering threshold for smart handover and perform handover only through the handover command message HO-CMD transmitted from the serving base station.

Figure 10:
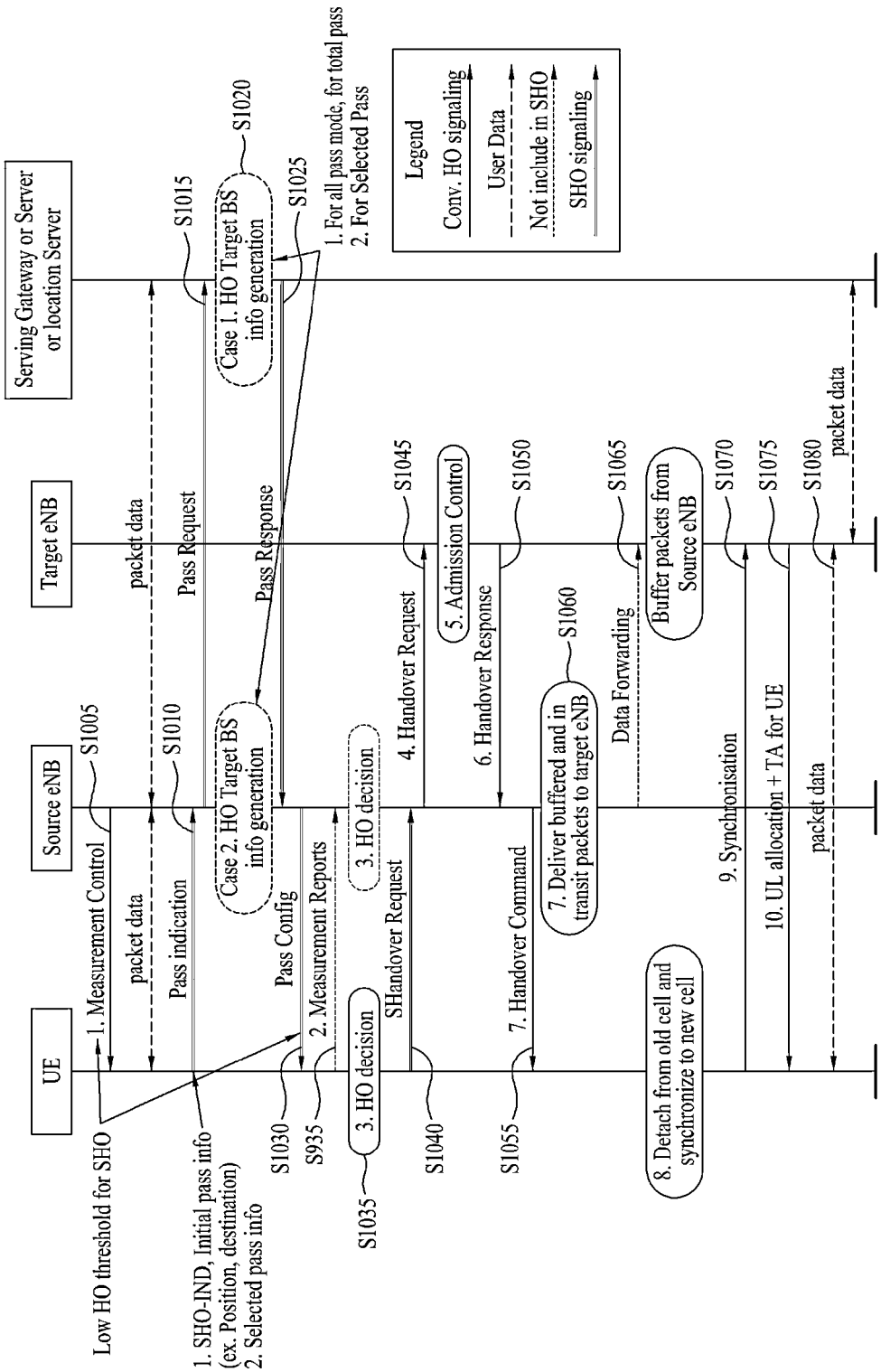
FIG. 10 is a diagram illustrating a process of performing smart handover when a mobile terminal determines whether handover is performed.

FIG. 10 is a diagram illustrating a process of performing smart handover when a mobile terminal (UE) determines whether handover is performed.

Referring to FIG. 10, a serving base station (a source eNB or a serving base station) transmits measurement control information for measurement and reporting performed for handover to the UE (S1005). The UE transmits path information (path indication) to the serving base station (S1010). At this time, the path information transmitted from the UE to the serving base station may include a smart handover indicator (SHO-IND) indicating that smart handover is performed and initial path establishment information. The initial path establishment information may include position and destination information.

Thereafter, the serving base station may transmit a path request message including the path information received the UE to a server (or a serving gateway or a position server) (that is, a core network) (S1015).

The server may generate information about a handover target base station on the path based on the received path information (S1020) and transmit the handover target base station information to the serving base station (S1025). The server may generate handover target base station information of all paths or generate handover target base station information of a selected specific path. Alternatively, the serving base station may generate the information about handover target base station on the path using the path information received from the UE.

The serving base station may transmit the information about the handover target base station on the path to the UE through a path configuration message (S1030). The handover target base station information transmitted from the serving base station to the UE may be information about a single base station or information about handover target base stations selected at a predetermined time/point. The target base station information may include base station information for handover at a current time or information about target base stations of all paths. The serving base station may include information about the handover time/position in the target base station information.

The path configuration message of step S1030 may further include handover triggering threshold information for smart handover (SHO). The handover triggering threshold information for smart handover may be set to be lower than a threshold (e.g., the received signal strengths of neighboring base stations to be measured) for triggering normal handover of a cellular terminal. If a smart handover indicator is received, the serving base station may set a low handover triggering threshold and inform the UE of the low handover triggering threshold. Alternatively, the serving base station may set a low handover triggering threshold when the UE enters the serving base station and transmit the low handover triggering threshold to the UE in step S1005.

The serving base station may differently set and transmit the handover triggering threshold according to UEs within the cell to each UE. The UE which performs smart handover may reduce measurement and reporting for handover within the cell without the indication of the serving base station, thereby reducing power consumption of the UE.

Thereafter, the UE may determine whether handover is performed (S1035). The UE which receives the information about the handover target base station on the path may perform handover using the received information. The received information may be handover target base station information of all paths or information about a target base station, to which the UE currently performs handover. The UE which receives the handover target base station information from the serving base station may determine whether handover is performed as follows.

A determination as to whether handover is performed is made based on a current position or a received signal strength (RSS) from the serving base station or an RSS from the target base station.

Case 1: When the RSS from the serving base station becomes equal to or less than a predetermined threshold, it is determined that handover is performed and the serving base station is informed of handover to the target base station.

Case 2: When the RSS from the serving base station becomes equal to or less than a first threshold threshold_1, the RSS from the target base station is measured. When the RSS from the serving base station becomes equal to or less than a second threshold threshold_2, it is determined that handover is performed and the UE informs the serving base station of handover to the target base station. If the number of target base stations is greater than one, a base station having a large RSS is set as a target base station.

Case 3: The UE may determine whether handover to the target base station is performed based on current position information. The information transmitted from the UE to the serving base station may include target base station information and handover location information. If the number of target base stations is greater than one, a base station having a large RSS is set as a target base station.

If the UE determines that handover is performed (S1035), a message requesting smart handover is transmitted to the serving base station (S1045). Thereafter, steps 1045 to S1080 of the handover process are equal to S945 to S980 of FIG. 8. The description of FIG. 9 may apply to FIG. 10 without change.

Figure 11:
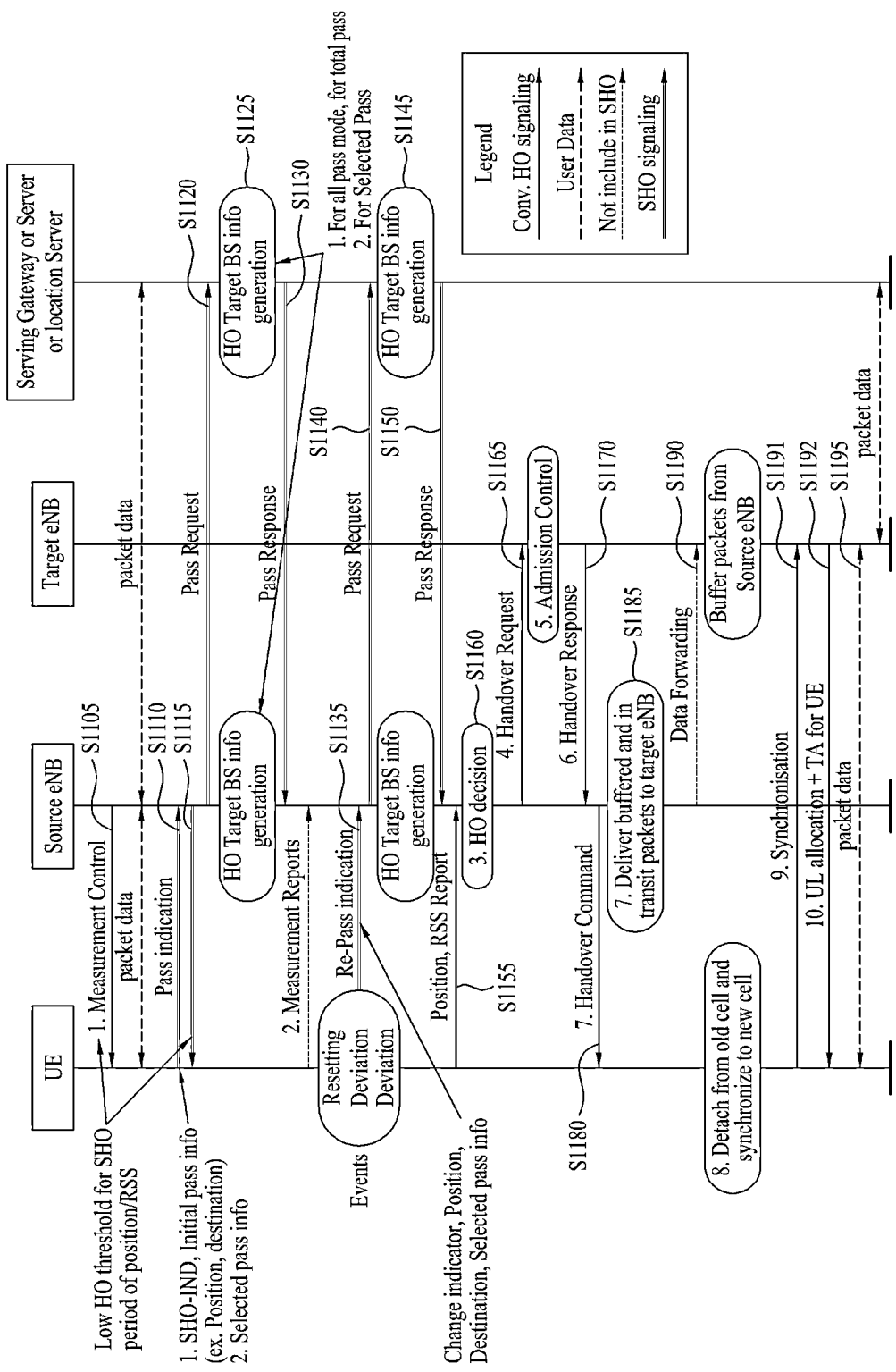
FIG. 11 is a diagram illustrating a process of performing event-triggered smart handover.

FIG. 11 is a diagram illustrating a process of performing event-triggered smart handover.

Referring to FIG. 11, a serving base station (a source eNB or a serving eNB) transmits measurement control information for measurement and reporting performed for handover to a mobile terminal (UE) (S1105). The UE transmits path information (path indication) for a path to be moved to the serving base station (S1110). At this time, the path information transmitted from the UE to the serving base station may include a smart handover indicator (SHO-IND) indicating that smart handover is performed and initial path establishment information. The initial path establishment information may include position and destination information. The UE may further transmit selected specific path information to the serving base station.

Thereafter, the serving base station may transmit handover triggering threshold information for smart handover (SHO) to the UE (S1115). The handover triggering threshold for smart handover may be set to be lower than a threshold (e.g., the received signal strengths of neighboring base stations to be measured) for triggering normal handover of a cellular terminal. If a smart handover indicator is received, the serving base station may set a low handover triggering threshold and inform the UE of the low handover triggering threshold. Alternatively, the serving base station may set a low handover triggering threshold when the UE enters the serving base station and transmit the low handover triggering threshold to the UE in step S1105.

The serving base station may differently set and transmit the handover triggering threshold according to UEs within the cell to each UE. The UE which performs smart handover may reduce measurement and reporting for handover within the cell without the indication of the serving base station, thereby reducing power consumption of the UE.

The serving base station sends the path information received from the UE to the server (or a serving gateway or a position server) (that is, a core network) through a path request message (S1120).

The server may generate information about a handover target base station on the path based on the received path information (S1125) and transmit the handover target base station information to the serving base station through a path response message (S1130). The server may generate handover target base station information of all paths or generate handover target base station information of a selected specific path. Alternatively, the serving base station may generate information about a handover target base station on the path using the path information received from the UE.

Thereafter, the UE needs to select a path if the established path is changed by the user. If the event is triggered, the UE may transmit the reestablished path information to the serving base station (S1135). The reestablished path information may include at least one of an indicator indicating that the path has been changed, a current position, a destination, information about a specific path selected from among many paths, etc. Steps S1140 to S1150 are equal to S1120 to S1130.

Thereafter, the UE transmits current position information to the serving base station (S1155). At this time, a received signal strength (RSS) (a received signal strength from the target base station and/or a received signal strength from the serving base station) may also be transmitted to the serving base station. At this time, the received signal strength may be transmitted only when a predetermined handover triggering threshold for smart handover is reached.

Then, the serving base station may determine whether handover is performed using the current position received from the UE (S1160).

The subsequent handover steps S1165 to S1194 are equal to steps S945 to S980 of FIG. 9.

Figure 12:
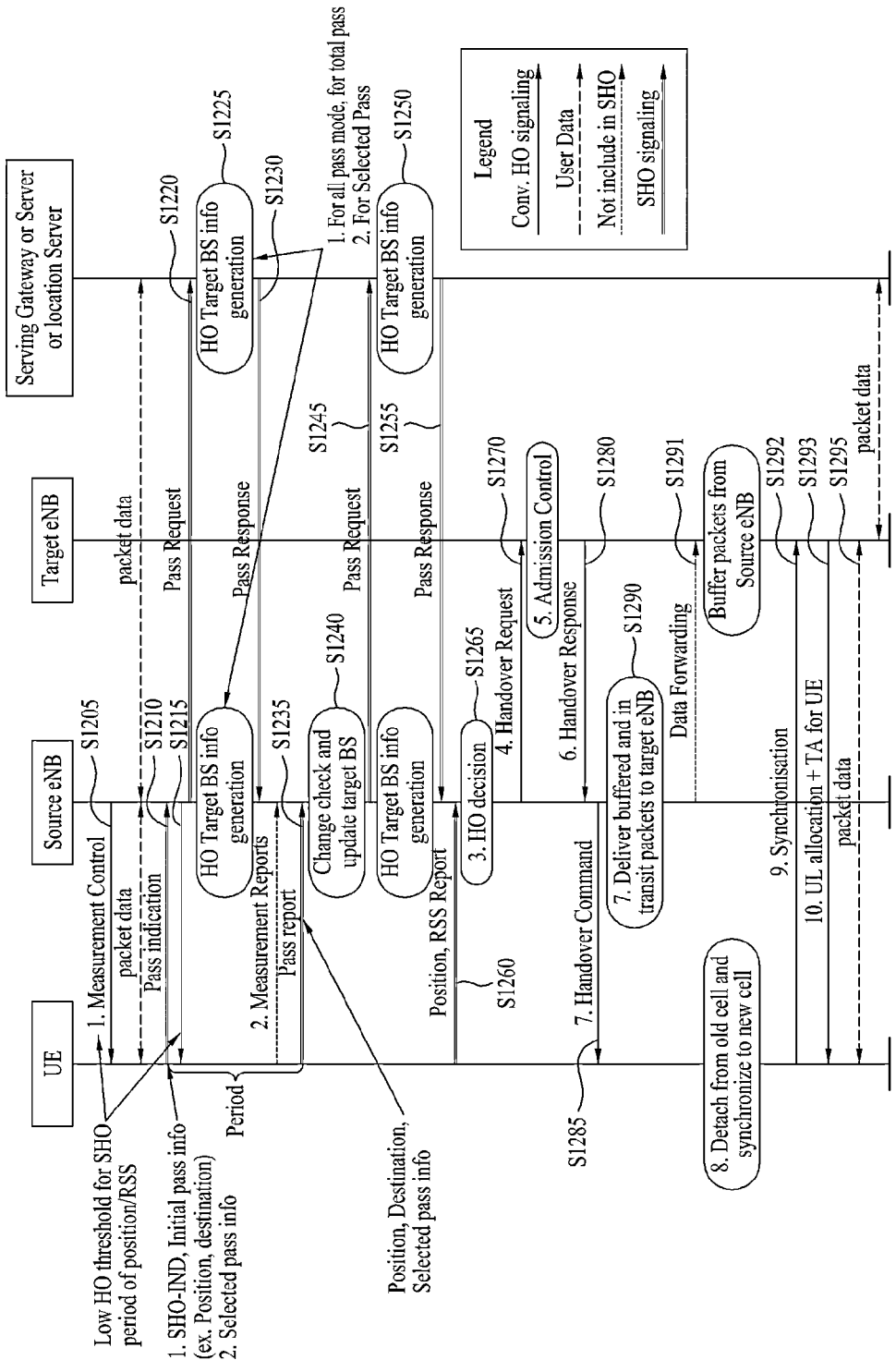
FIG. 12 is a diagram illustrating a process of performing periodic reporting-based smart handover.

FIG. 12 is a diagram illustrating a process of performing periodic reporting-based smart handover.

Referring to FIG. 12, a serving base station (a source eNB or a serving base station) transmits measurement control information for measurement and reporting performed for handover to the UE (S1205). The UE transmits path information (path indication) to the serving base station (S1210). At this time, the path information transmitted from the UE to the serving base station may include a smart handover indicator (SHO-IND) indicating that smart handover is performed and initial path establishment information. The initial path establishment information may include position and destination information. Alternatively, the UE may further transmit selected specific path information to the serving base station.

Thereafter, the serving base station may transmit handover triggering threshold information for smart handover (SHO) to the UE (S1215). The handover triggering threshold for smart handover may be set to be lower than a threshold (e.g., the received signal strengths of neighboring base stations to be measured) for triggering normal handover of a cellular terminal. If a smart handover indicator is received, the serving base station may set a low handover triggering threshold and inform the UE of the low handover triggering threshold. Alternatively, the serving base station may set a low handover triggering threshold when the UE enters the serving base station and transmit the low handover triggering threshold to the UE in step S1205.

The serving base station may differently set and transmit the handover triggering threshold according to UEs within the cell to each UE. The UE which performs smart handover may reduce measurement and reporting for handover within the cell without the indication of the serving base station, thereby reducing power consumption of the UE.

The serving base station sends the path information received from the UE to the server (or a serving gateway or a position server) (that is, a core network) through a path request message (S1220).

The server may generate information about a handover target base station on the path based on the received path information (S1225) and transmit the handover target base station information to the serving base station through a path response message (S1230). The server may generate handover target base station information of all paths or generate handover target base station information of a selected specific path. Alternatively, the serving base station may generate the information about the handover target base station on the path using the path information received from the UE.

In step S1210, if a specific time has elapsed from a time when initial path establishment information is transmitted (if period arrives), the UE transmits the path information to the serving base station again (S1235). The transmitted path information includes at least one of a current position, a destination, selected specific path information, etc. The serving base station checks the received path information, determines whether the path has been changed and updates the target base station (S1240).

Thereafter, the serving base station transmits the path information received in step S1235 to the server (or a serving gateway or a position server) (that is, a core network) through a path request message (S1245).

The server may generate information about the handover target base station on the path based on the received path information (S1250) and transmit the handover target base station information to the serving base station through a path response message (S1255). Alternatively, the serving base station may generate the information about the handover target base station on the path using the path information received in step S1235.

Thereafter, the UE transmits current position information to the serving base station (S1260). At this time, a received signal strength (RSS) (a received signal strength from the target base station and/or a received signal strength from the serving base station) may also be transmitted to the serving base station. At this time, the received signal strength may be transmitted only when a predetermined handover triggering threshold for smart handover is reached.

Then, the serving base station may determine whether handover is performed using the current position received from the UE (S1265).

The subsequent handover steps S1270 to S1295 are equal to steps S945 to S980 of FIG. 9.

Case in which a User does not Establish a Path

Figure 13:
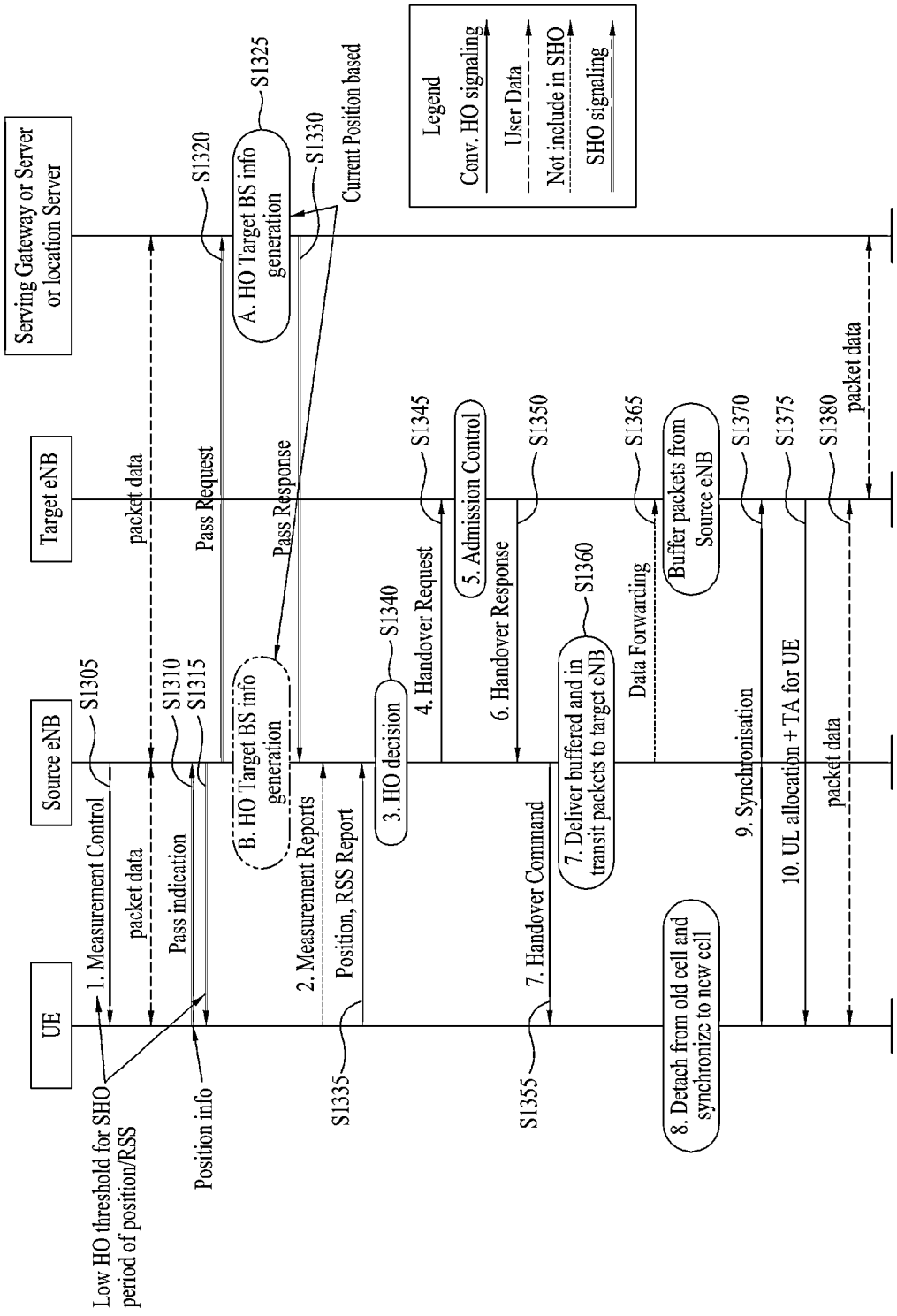
FIG. 13 is a diagram illustrating a process of performing current position-based smart handover.

FIG. 13 is a diagram illustrating a process of performing current position-based smart handover.

Referring to FIG. 13, a serving base station (a source eNB or a serving base station) transmits measurement control information for measurement and reporting performed for handover to the UE (S1305). The UE may transmit current position information to the serving base station through a data channel or a control channel (S1310). The UE may transmit the periodically acquired current position information to the serving base station. At this time, the path information transmitted from the UE to the serving base station may include a smart handover indicator (SHO-IND) indicating that smart handover is performed.

Thereafter, the serving base station may transmit handover triggering threshold information for smart handover (SHO) to the UE (S1315). The handover triggering threshold for smart handover may be set to be lower than a threshold (e.g., the received signal strengths of neighboring base stations to be measured) for triggering normal handover of a cellular terminal. If a smart handover indicator is received, the serving base station may set a low handover triggering threshold and inform the UE of the low handover triggering threshold. Alternatively, the serving base station may set a low handover triggering threshold when the UE enters the serving base station and transmit the low handover triggering threshold to the UE in step S1305.

The serving base station may differently set and transmit the handover triggering threshold according to UEs within the cell to each UE. The UE which performs smart handover may reduce measurement and reporting for handover within the cell without the indication of the serving base station, thereby reducing power consumption of the UE.

The serving base station sends the path information received from the UE to the server (or a serving gateway or a position server) (that is, a core network) through a path request message (S1320).

The server may generate handover target base station information based on the received path information (S1325) and transmit the handover target base station information to the serving base station through a path response message (S1330). The server may generate information about a handover target base station near the UE or on the current path using the position information transmitted by the UE. The handover target base station information may be generated at the serving base station or a higher layer (e.g., a server). The handover target base station information may be information about a single base station or information about a maximum of three base stations. The handover target base station information generated by the server or the serving base station may be transmitted to the UE or stored in the serving base station.

If the generated handover target base station information is transmitted to the UE, the serving base station may also transmit information about a handover triggering threshold and a handover time/position along with the above-described information. The UE may omit an initialization or measurement process through handover using the information received from the serving base station and immediately perform handover.

If the serving base station stores the handover target base station information, the serving base station may determine whether handover of the UE is performed using the position information transmitted by the UE and a received signal strength (a received signal strength from the target base station and/or a received signal strength from the serving base station) (S1340). If it is determined that handover is performed (S1340), the serving base station may transmit the target base station information to the UE so as to perform handover to the target base station.

That is, the UE may transmit the current position information (which may further include the received signal strength from the target base station and/or the received signal strength from the serving base station) to the serving base station (S1335). At this time, the received signal strength may be transmitted only when a predetermined handover triggering threshold for smart handover is reached.

Then, the serving base station may determine whether handover is performed using the current position received from the UE (S1340).

The subsequent handover steps S1345 to S1380 are equal to steps S945 to S980 of FIG. 9.

FIG. 14 is a diagram illustrating a process of performing smart handover using location information acquired through a location-based service (LBS).

Referring to FIG. 14, a serving base station (a source eNB or a serving base station) transmits measurement control information for measurement and reporting performed for handover to the UE (S1405). The UE may transmit a smart handover indicator indicating that smart handover will be performed to the serving base station (S1410).

Thereafter, negotiation for the LBS (e.g., ranging information, a frame number, a period, etc.) is conducted between the serving base station and the target base station (S1415) and the serving base station transmits the negotiation result to the UE (S1420). The serving base station and the target base station measure timing adjustment and measure a current position. The serving base station may check the position of the UE having capability for smart handover and LBS through an LBS operation. The LBS may start through mobility management of the UE or through a smart handover indication.

The serving base station which checks the position information of the UE may generate handover target base station information of the UE (S1425). Alternatively, if the serving base station transmits a path request message to the server (S1430), the server may generate handover target base station information based on the current position of the UE (S1435). Then, the server transmits the generated handover target base station information to the serving base station (S1440).

Thereafter, the serving base station determines whether handover is performed using the position information of the UE (S1445). At this time, a determination as to whether handover is performed is made based on an estimated time, a start point, a received signal strength (a received signal strength from the target base station and/or a received signal strength from the serving base station).

Using the generated handover target base station information, the serving base station or the server may transmit information about the UE, an estimated arrival time, position information, etc. to the corresponding base station (S1430 or S1440). The subsequent handover steps S1450 to S1485 are equal to steps S945 to S980 of FIG. 9.

According to various embodiments of the present invention, since a mobile terminal which moves along an established movement path efficiently performs smart handover, it is possible to reduce power consumption and to improve communication performance.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for performing a handover at a serving base station in a wireless communication system, the method comprising:

receiving an indicator from a mobile terminal, the indicator indicating that the mobile terminal will perform a handover of a specific handover type, the handover type of the specific handover type being performed without performing a measurement for the handover when the mobile terminal moves on a predetermined movement path;

performing a negotiation related to a location-based service (LBS) with a target base station according to the indicator;

transmitting a negotiation result to the mobile terminal;

transmitting a path request message to a core network node;

receiving handover target base station information from the core network node, the handover target base station information being generated based on a current position of the mobile terminal; and transmitting, to the target base station, an estimated time at which the mobile terminal will arrive at the target base station.

2. The method according to claim 1, wherein the negotiation related to a location-based service (LBS) comprises:

a negotiation related to ranging information for the LBS;

a frame number for the LBS; or a period for the LBS.

3. The method according to claim 1, further comprising determining whether to perform the handover based on the current position of the mobile terminal.

4. The method according to claim 1, wherein the core network node corresponds to: a server, a position server, or a serving gateway.

5. A serving base station for performing a handover in a wireless communication system, the serving base station comprising:

a receiver;

a transmitter; and a processor, configured to:

control the receiver to receive an indicator from a mobile terminal, the indicator indicating that the mobile terminal will perform a handover of a specific handover type, the handover of the specific handover type being performed without performing a measurement when the mobile terminal moves on a predetermined movement path;

perform a negotiation related to a location-based service (LBS) with a target base station according to the indicator;

control the transmitter to transmit a negotiation result to the mobile terminal;

control the transmitter to transmit a path request message to a core network node;

control the receiver to receive handover target base station information from the core network node, the handover target base station information being generated based on a current position of the mobile terminal; and control the transmitter to transmit, to the target base station, an estimated time at which the mobile terminal will arrive at the target base station.

6. The serving base station according to claim 5, wherein the negotiation related to a location-based service (LBS) comprises:

a negotiation related to ranging information for the LBS;

a frame number for the LBS; or a period for the LBS.

7. The serving base station according to claim 5, wherein the processor is further configured to determine whether to perform the handover based on the current position of the mobile terminal.

8. The serving base station according to claim 5, wherein the core network node corresponds to: a server, a position server, or a serving gateway.

* * * * *